3,520,903
BETA-THIOLACTONES
Arleen C. Pierce, Monmouth Junction, N.J., assignor to Allied Chemical Corporation, New York, N.Y., a corporation of New York
No Drawing. Filed Oct. 6, 1967, Ser. No. 673,259
Int. Cl. C07d 61/00
U.S. Cl. 260—327                    7 Claims

ABSTRACT OF THE DISCLOSURE

This specification discloses a process for the preparation of β-thiolactones whereby carbonyl sulfide is reacted with an ethylenically unsaturated compound in the presence of actinic radiation having a wave length between 2800 and 366 angstrom units. This process can be used to prepare known β-thiolactones and novel perhalogenated β-thiolactones which are useful as monomers for the preparation of polyesters as well as chemical intermediates for the preparation of thiocarboxylic acids or their ester and amide derivatives.

---

Several processes are known for the preparation of β-thiolactones, but none are completely satisfactory. In U.S. Pat. 2,978,460, there is disclosed a process for the preparation of beta- and gamma-thiolactones by reaction of the corresponding beta- and gamma-halo acid halides with a metal sulfide containing a controlled degree of hydration under substantially anhydrous conditions. In practice, however, it is difficult to obtain the metal sulfide in sufficiently pure anhydrous state and to maintain anhydrous conditions during the reaction. M. Linkova et al., Isvest. Akad. Nauk, SSSR, Otdel, Khim. Nauk, pp. 569–570 (1955), describe a process for the preparation of β,β'-dimethylpropiothiolactone whereby the triethylammonium salt of mercaptoisovaleric acid is reacted with chloroformic acid at −5° C. Knunyants et al., Isvest. Akad. Nauk, SSSR, Seriya Khim., No. 4, pp. 644–651 (1964), describe a process for the preparation of β-thiolactones substituted in the alpha-position by reacting the corresponding β-halo-acid chloride in dilute solution with hydrogen sulfide in the presence of triethylamine. These processes are specific for a limited class of products, and unsubstituted β-thiolactones cannot be prepared by these methods.

It has now been discovered that β-thiolactone compounds may be readily prepared by reacting carbonyl sulfide with an ethylenically unsaturated compound in the presence of actinic light. The process of the present invention possesses the advantages of utilizing readily available, inexpensive starting materials and is generally applicable to preparation of a wide variety of β-thiolactone products. In addition to known β-thiolactones, certain novel perhalogenated β-thiolactone compounds may be prepared by the present process.

In accordance with one aspect of the present invention, β-thiolactone compounds conforming to the general formula:

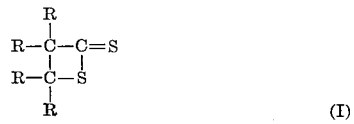

wherein each R individually represents a member selected from the group consisting of hydrogen, halogen having an atomic weight below about 35.5, alkyl, haloalkyl wherein each halogen subsituent has an atomic weight below about 35.5, aryl- and alkyl-, halo- and haloalkyl-substituted derivatives thereof wherein each halogen substituent has an atomic weight below about 35.5 are prepared by reacting, in the presence of actinic radiation of wave length of about 2800 to 3600 angstrom units, carbonyl sulfide with a liquid ethylenically unsaturated compound having the formula:

wherein each R has the above defined meaning, with the proviso that not more than an alkyl, haloalkyl, aryl or substituted aryl group is present on any one ethylenically unsaturated carbon atom.

Another aspect of the present invention is the provision of fully halogenated β-propiothiolactone compounds which are believed to be new chemical compounds. These perhalogenated β-propiothiolactone compounds may be represented by Formula I, above, wherein each R individually represents halogen having an atomic weight below about 35.5 or a perhaloalkyl group having from 1 to 12, preferably 1 to 8, carbon atoms, in which all halogen atoms have an atomic weight below about 35.5

Referring to Formula II, above, wherein one or both carbon atoms of the ethylenically unsaturated compound are substituted by alkyl, haloalkyl, aryl or substituted aryl substituents, it is desirable that not more than one such substituent be present on any one ethylenically unsaturated carbon atom since such bulky radicals, due to steric hindrance, tend to seriously impair the reaction rate. When the ethylenically unsaturated compound is substituted by alkyl, haloalkyl, aryl or substituted aryl groups, the number of carbon atoms contained therein is not critical provided that the ethylenically unsaturated compound is in the liquid state under the reaction conditions. In general, however, when R represents an alkyl or haloalkyl radical, the number of carbon atoms contained threin may range from 1 to about 18, although alkyl or haloalkyl substituents containing from 1 to 8 carbon atoms are preferred. When R represents an alkyl- or haloalkyl-substituted aryl group, the alkyl or haloalkyl substituent will normally contain from about 1 to 4 carbon atoms. Typical aryl substituents include phenyl, naphthyl, and the like. Ethylenically unsaturated compounds having from 1 to 8 carbon atoms and containing only carbon, hydrogen and halogen atoms constitute preferred embodiments of ethylenically unsaturated compounds suitable as starting materials in the process of the present invention.

Representative specific ethylenically unsaturated compounds that may be employed as starting materials in the process of the present invention include ethylene; propylene; butene-1; butene-2; isobutylene; pentene-1; pentene-2; 2-methylbutene-1; 3-methylbutene-1; hexene-1; heptene-1; octene-1; 1,1-dichloro-2,2-difluoroethylene; 1, 1 - difluoro-2-chloro-2-fluoroethylene; 1 - chloro-1-fluoro-2-chloro-2-fluoroethylene; 1 - fluoro-1-chloro-2-dichloroethylene; tetrafluoroethylene; vinylidene fluoride; 1-chloro-2,2-difluoroethylene; 1-chloro - 2 - chloro-2-fluoroethylene; 1-fluoro-2,2-dichloroethylene; 1-fluoro-1-chloroethylene; 1 - fluoro-2-chloroethylene; 1,1-difluoro-2-fluoro-3-chloro-3,3-difluoropropene - 1; 1,1-difluoro-2-fluoro-3,3,3-trifluoropropene-1; 1,1-difluoro-2-fluoropropene - 1; 1,1,1-trifluoro-2-fluoro-3-chloro-4,4,4 - trifluorobutene - 2; 1,1-difluoro - 2 - fluoro - 3 - fluoro-3-chloro-4-chloro-4,4 - trifluorobutene-1; 2-fluoro-3,3-difluoro-4,4,4-trifluorobutene-1; 2-fluorobutene-1; styrene; stilbene; allylbenzene; 4-methylstyrene; 4 - chlorostyrene; 4 - fluorostyrene; 3 - trifluoromethylstyrene; 3-chloromethylallybenzene; and the like. If desired, mixtures of ethylenically unsaturated compounds may also be employed as starting materials in the process in which case the corresponding mixtures of β-propiothiolactones will be obtained as products.

The reaction which occurs in practice of the present invention may be represented by the following equation in which each R has the above defined meaning:

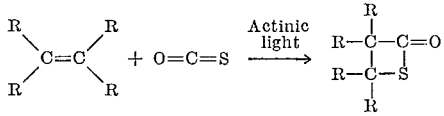

The reactant proportions may be varied over a wide range, for example, from about one mol to about five mols, and higher, of carbonyl sulfide per mol of ethylenically unsaturated compound. In general, it is desirable to employ a stoichiometric excess of carbonyl sulfide in order to effect maximum conversion of the ethylenically unsaturated compound to desired β-propiothiolactone. Accordingly, preferred reactant proportions range from about 1.1 to about 2 mols of carbonyl sulfide per mol of ethylenically unsaturated compound.

As previously indicated, the reaction is conducted in the presence of a light source of sufficient radiation to catalyze the reaction between the ethylenically unsaturated compound and carbonyl sulfide. It has been found that the light source which is capable of catalyzing the reaction must have an actinic radiation wave length of about 2800 to about 3600 Angstrom units and more advantageous results are obtained when the radiation wave length is maintained during the radiation between about 3000 to 3200 Angstrom units. Actinic radiation of the required wave length is readily obtainable from any conventional light source such as high or low pressure mercury vapor lamps, and ultra-violet fluorescent light. The light source may be used alone or in conjunction with well-known photosensitizers such as acetone, acetophenone and benzophenone, which may be present in an amount generally ranging from about 0.5% to 5% by weight, based on the weight of the reaction mixture.

It is additionally essential that the reaction be carried out at such temperatures as to maintain the ethylenically unsaturated compound in the liquid state. At reaction temperatures above the boiling point of the ethylenically unsaturated compound, the reaction, which is highly exothermic, may become uncontrollable. At very low temperatures, however, the formation of episulfides and their polymers becomes the predominant reaction which materially lowers the yield of desired β-propiothiolactone product. Accordingly, suitable temperatures at which the reaction may be conducted at atmospheric pressure map range from about −80° C. to about 35° C., although temperatures in the range from about −20° C. to −50° C. are preferred.

The reaction is conducted for a time sufficient to permit formation of at least some β-propiothiolactone product. In general, the reaction is dependent upon several factors, such as the reactivity of the ethylenically unsaturated reactant, temperature, and the like, and is varied from about 1 hour up to about 20 hours. Normally, a longer reaction time will result in increased yields of the desired β-propiothiolactone product.

Although the reaction will proceed in the absence of any diluent, if desired, an organic liquid which is inert to the ethylenically unsaturated compound and carbonyl sulfide reactants and to the β-propiothiolactone product and which will remain liquid at the temperatures of the reaction may be employed as diluent and/or solvent therefor. In those cases where the reaction is particularly exothermic, the presence of an inert diluent will aid in dissipating the heat of reaction. Suitable organic liquids which may serve as diluents in the reaction include aliphatic and cycloaliphatic hydrocarbons such as ethane, n-propane, n-hexane, n-heptane, n-octane, cyclohexane, and the like.

Although the presence of water does not render the process inoperative, it is preferred that the reation be carried out under anhydrous conditions since there is a possibility that the β-propiothiolactone product may be hydrolyzed if sufficient water is present. The order of addition of the reactants is not critical, and thus, the carbonyl sulfide, either in liquid or gaseous form, may be added to the liquid ethylenically unsaturated compound, either alone or in solution. The order of addition may be reversed if desired by adding the liquid ethylenically unsaturated compound to the carbonyl sulfide reactant. Alternatively, the ethylenically unsaturated compound and carbonyl sulfide reactants may be fed simultaneously into the reactor either undiluted or with a diluent. The preferred method is to charge the ethylenically unsaturated compound, alone or with a diluent and/or a photosensitizer, into a reactor, purge the reactor with a stream of purified nitrogen, introduce into the reactor the desired quantity of carbonyl sulfide either alone or with a diluent, and subject the reactor contents to irradiation for the desired reaction time.

The β-propiothiolactone product may be separated from the reaction mixture by conventional methods, such as by fractional distillation to remove unreacted ethylenically unsaturated compound and carbonyl sulfide, low boiling by-products and, if employed, organic diluent, and is recovered as the distilland. Alternatively, the β-propiothiolactone may be recovered by crystallization from a concentrated solution if it is a solid at room temperature.

The following examples illustrate practice of the invention but are not construed as being limiting on the same. The reactor employed was a quartz lined reactor fitted with a Hanovia 450-watt high-pressure quartz mercury vapor lamp enveloped by a Pyrex filter, inlet tube for gases, reflux condenser, and stirrer.

EXAMPLE 1

A reactor of the type described above was purged with a stream of nitrogen which had been previously purified and dried by passing commercially available nitrogen through a mixture containing about 1.25 mols pyridine, 0.01 mol triphenylmethane and 0.01 mol lithium aluminum hydride. To the purified reactor there was first added 3 ml. of acetone and then there was condensed, at a temperature of −72° C., 2.0 mols of carbonyl sulfide and 0.53 mol of 1,1-dichloro-2,2-difluoroethylene. The resultant mixture, while being maintained at about said temperature, was then subjected to actinic radiation of wave length of about 2900–3300 Angstrom units over a 21 hour period. Unreacted carbonyl sulfide, 1,1-dichloro-2,2-difluoroethylene and other volatile materials were removed by warming the reactor to room temperature. The liquid product, as determined by gas-liquid chromatography, showed a yield of 57% of α,α-dichloro-β,β-difluoro-β-propiothiolactone and 1.7% of α,α-difluoro-β,β-dichloro-β-propiothiolactone.

The β-propiothiolactone structure of the resultant products was confirmed by infrared analysis which showed a ν max. C=O of 1730 cm.$^{-1}$ for α,α-dichloro-β,β-difluoro-β-propiothiolactone and a ν max. C=O of 1750 cm.$^{-1}$ for the α,α-difluoro-β-β-dichloro-β-propiothiolactone.

EXAMPLE 2

A reactor of the type described above was purged with nitrogen prepurified in the manner described in Example 1. To the purified reactor there was first added 3 ml. of acetone and then there was condensed, at a temperature of −72° C., 1.66 mols of carbonyl sulfide and 1.71 mols of 1,1-difluoro-2-chloro-2-fluoroethylene. The resultant mixture, while being maintained at about said temperature, was then subjected to actinic radiation of wave length of about 2900–3300 Angstrom units over a 10-hour period. Unreacted carbonyl sulfide, 1,1-difluoro-2-chloro-2-fluoroethylene and other volatile materials were removed by warming the reactor to room temperature. The liquid product, as determined by gas-liquid chromatography, showed a yield of 63.7% α-chloro-α,β,β-trifluoro-β-propiothiolactone and 4.5% of β-chloro-α,α,β-trifluoro-β-propiothiolactone.

The β-propiothiolactone structure of the resultant α-chloro-α,β,β-trifluoro-β-propiothiolactone product was confirmed by infrared analysis which showed a ν max. C=O of 1730 cm.⁻¹.

EXAMPLE 3

Into a reactor of the type described above there was charged 2.5 mols of dried technical grade pentene (a commercially available mixture of n-pentene-1 and n-pentene-2). The reactor was purged with a stream of nitrogen prepurified in the manner described in Example 1, above, and benzophenone in an amount of approximately 0.1% by weight of the reactor contents was added to the reactor. 2.83 mols of carbonyl sulfide were then bubbled into the reactor over a period of about 50 minutes. The resultant mixture was then subjected to actinic radiation of wave length of about 2900–3300 Angstrom units over a 10-hour period while maintaining the temperature of the reactor contents in the range of about 21–36° C. Unreacted carbonyl sulfide, pentenes and other volatile materials were removed by fractional distillation and a liquid product comprised of a mixture of α-n-propyl-β-propiothiolactone, β-n-propyl-β - propiothiolactone, α-ethyl-β-methyl-β-propiothiolactone and α-methyl-β-ethyl-β-propiothiolactone was recovered as distilland. The total yield of β-propiothiolactone product was 16% by weight as calculated by gas-liquid chromatography. The β-propiothiolactone structure of the product was confirmed by infrared analysis which showed a ν max. C=O of 1740 cm.⁻¹.

The β-propiothiolactones prepared by the process of the present invention are useful for many purposes. For example, the β-propiothiolactones may be reacted chemically with bone dry cotton linters to add sulfur-containing side chains to cotton fibers. The β-propiothiolactones may also be polymerized in the presence of a free radical catalyst by known procedures to polyesters having a wide range of utility. For example, the relatively low molecular weight polyesters are useful in preparation of plasticizers, cosmetics, polishes and waxes and can also be used as thickening agents for various lubricants. The higher molecular weight polyesters are useful in the preparation of molded articles, films, fibers and the like. The β-propiothiolactone products of the present invention will also undergo base-catalyzed addition reactions with such nucleophilic compounds as sodium hydroxide, sodium methoxide, sodamide, primary and secondary amines, and the like, to prepare the corresponding thiocarboxylic acids, esters, amides, etc. which exhibit a variety of uses themselves or may serve as intermediates for the preparation of other useful compounds. For example, the thiocarboxylic acids may be employed as antioxidants for organic hydrocarbons, as color stabilizers, and catalysts for phenol ketone condensation reactions.

Since various changes and modifications may be made in the invention without departing from the spirit thereof it is intended that all matter contained in the above description be interpreted as illustrative and not in a limiting sense.

I claim:

1. A perhalogenated β-propiothiolactone compound having the formula:

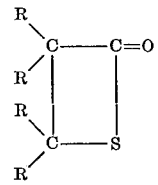

wherein each R individually represents a member selected from the group consisting of halogen having an atomic weight below about 35.5 and perhalomethyl in which each halogen atom has an atomic weight below about 35.5, with the proviso that not more than one perhaloalkyl group is present on each carbon atom of the lactone ring.

2. A perhalogenated β-propiothiolactone compound as defined in claim 1 wherein at least one R is a perhaloalkyl group.

3. A perhalogenated β-propiothiolactone compound as defined in claim 1 wherein each R is a halogen atom.

4. α,α-Dichloro-β,β-difluoro-β-propiothiolactone.
5. α,α-Difluoro-β,β-dichloro-β-propiothiolactone.
6. α-Chloro-α,β,β-trifluoro-β-propiothiolactone.
7. β-Chloro-α,α,β-trifluoro-β-propiothiolactone.

References Cited

Knunyants et al.: C. A. 61, 2966, Aug. 3, 1964.

HENRY R. JILES, Primary Examiner

C. M. SHURKO, Assistant Examiner

U.S. Cl. X.R.

106—3; 204—158; 252—48.2, 406; 260—79.7, 455, 502.6, 621

PO-1050
(5/69)

UNITED STATES PATENT OFFICE
CERTIFICATE OF CORRECTION

Patent No. 3,520,903           Dated July 21, 1970

Inventor(s) Arleen C. Pierce

It is certified that error appears in the above-identified patent and that said Letters Patent are hereby corrected as shown below:

Column 1, line 16 "366" should be --3600--.

Column 1, line 62 "R—C—C=S" should be R—C—C=O --.

Column 1, line 68 "subsituent" should be --substituent--.

Column 2, line 11 "an" should be --one--.

Column 3, line 49 "map" should be --may--.

Column 3, line 73 "reation" should be --reaction--.

Claim 1, line 29 "haloalkyl" should be --halomethyl--.

Claim 2, line 33 "haloalkyl" should be --halomethyl--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents